US005282411A

United States Patent [19]

Hirai et al.

[11] Patent Number: 5,282,411

[45] Date of Patent: Feb. 1, 1994

[54] HEAT-INSULATING PISTON WITH MIDDLE SECTION OF LESS DENSE BUT SAME MATERIAL

[75] Inventors: Katsunori Hirai, Yamato; Hiroshi Matsuoka, Yamato, both of Japan

[73] Assignee: Isuzu Motors Limited, Tokyo, Japan

[21] Appl. No.: 853,858

[22] Filed: Mar. 19, 1992

Related U.S. Application Data

[63] Continuation-in-part of Ser. No. 551,230, Jul. 11, 1990, abandoned.

[30] Foreign Application Priority Data

Aug. 10, 1989 [JP] Japan ........ 1-205647

[51] Int. Cl.[5] ........ F01B 31/08; F16J 1/04

[52] U.S. Cl. ........ 92/176; 92/212; 92/213; 123/193.6

[58] Field of Search ........ 92/176, 212, 213, 222, 92/224, 231; 123/193.6

[56] References Cited

U.S. PATENT DOCUMENTS

| | | | |
|---|---|---|---|
| 2,947,582 | 8/1960 | Laagewaard | 92/176 |
| 3,149,409 | 9/1964 | Maruhn | 123/193 P |
| 3,911,891 | 10/1975 | Dowell | 92/213 X |
| 4,142,500 | 3/1979 | Davis | 123/193 P |
| 4,242,948 | 1/1981 | Stang et al. | 123/193 P X |
| 4,245,611 | 1/1981 | Mitchell et al. | 123/193 P X |
| 4,343,229 | 8/1982 | Tsuzuki et al. | 92/224 X |
| 4,404,935 | 9/1983 | Kraft | 123/193 P |
| 4,530,341 | 7/1985 | Palm | 123/193 P X |
| 4,531,502 | 7/1985 | Mizuhara | 123/193 P X |
| 4,538,562 | 9/1985 | Matsui et al. | 92/212 X |
| 4,546,048 | 10/1985 | Guenther | 123/193 P X |
| 4,552,057 | 11/1985 | Mizuhara | 92/176 |
| 4,553,472 | 11/1985 | Munro et al. | 92/176 |
| 4,590,901 | 5/1986 | Mizuhara | 92/212 X |
| 4,604,945 | 8/1986 | Mizuhara | 92/176 |
| 4,646,707 | 3/1987 | Pfefferle | 123/193 P X |
| 4,651,630 | 3/1987 | Zeilinger et al. | 92/212 |
| 4,667,627 | 5/1987 | Matsui et al. | 92/222 X |
| 4,694,813 | 9/1987 | Mielke | 123/193 P X |
| 4,709,621 | 12/1987 | Matsui et al. | 92/213 X |
| 4,735,128 | 4/1988 | Mahrus et al. | 92/212 |
| 4,746,582 | 5/1988 | Tsuno | 92/224 X |
| 4,774,926 | 10/1988 | Adams | 123/193 P X |
| 4,798,770 | 1/1989 | Donomoto et al. | 92/224 X |
| 4,830,932 | 5/1989 | Donomoto et al. | 92/222 X |
| 4,848,291 | 7/1989 | Kawamura et al. | 123/193 P |

FOREIGN PATENT DOCUMENTS

| | | |
|---|---|---|
| 0111989 | 6/1984 | European Pat. Off. . |
| 0294092 | 7/1988 | European Pat. Off. . |
| 2061383 | 10/1980 | United Kingdom . |

*Primary Examiner*—Edward K. Look
*Assistant Examiner*—John Ryznic
*Attorney, Agent, or Firm*—Browdy and Neimark

[57] ABSTRACT

This heat-insulating piston has a piston head comprising a piston head base portion consisting of a ceramic material, a heat-insulating member jointed to the piston head base portion and consisting of a whisker fired member of the same ceramic material as that of the piston head base portion, and a laminate jointed to the surface of the heat-insulating member that faces the combustion chamber, as well as to the surface that slides and consisting of the same ceramic material as that of the heat-insulating member. The heat-insulating member is stably jointed to the piston head base portion and laminate by utilizing the same ceramic material for the heat-insulating member, piston head base portion and laminate, whereby the strength of the piston head can be improved. Furthermore, the heat-insulating capability of the piston can be improved, while the thermal capacity of the laminate is made small, whereby the suction efficiency can also be improved.

10 Claims, 3 Drawing Sheets

HEAT-INSULATING PISTON WITH MIDDLE SECTION OF LESS DENSE BUT SAME MATERIAL

This application is a continuation-in-part of application Ser. No. 07/551,230, filed Jul. 11, 1990, now abandoned.

BACKGROUND OF THE INVENTION

1. Field of the Invention

The present invention relates to a heat-insulating piston for a heat-insulating engine.

2. Description of the Prior Art

A conventional heat-insulating piston as shown in FIG. 4 has been disclosed. In FIG. 4, a mounting boss portion 28 formed at the center of a heat base portion 21 is fitted into a mounting hole 31 formed in the center of a piston skirt portion 22, and the two members are fixed together by means of a metal flow 29. In this example, a stepped portion 32 is formed on the inner circumferential surface of a ring portion 24 that constitutes the upper portion of the sliding surface of a piston, and the head base portion 21 is locked onto this stepped portion 32 at the outer circumferential portion 33 thereof. In addition, the ring portion 24 is fixed to the piston skirt portion 22 in a pressed state via a sealing member 27. Furthermore, a heat-insulating layer 23 is provided in the cylindrical bore portion constituted by the head base portion 21 and ring portion 24, and a thin plate 25 formed of a ceramic material is placed on the surface of the heat-insulating layer 23 that faces a combustion chamber. In FIG. 4, reference numeral 26 denotes a layer of heat-insulating air.

A heat-insulating piston having a structure similar to the above-described one is disclosed in the specification of U.S. Pat. No. 4,848,291 (refer to the official gazette of Japanese Patent Laid-Open No. 302164/1988) filed by the applicant of the present invention. The structure of the heat-insulating piston so disclosed will be briefly described with reference to FIG. 5. The piston comprises a piston head 41 having at its central portion a boss 44 and formed of a material having a coefficient of thermal expansion substantially equal to that of a ceramic material, and a metallic piston skirt 42 having at its central portion a mounting hole 52 into which the mounting boss 44 is fitted. In addition, the mounting boss 44 of the piston head 41 is set fixedly in the central mounting hole 52 in the piston skirt 42 by means of a metal ring 51 as a metal flow.

A buffer member 48 consisting of a heat-insulating gasket is inserted in a pressed stage between the piston heat 41 and piston skirt 42 at the central portion where the two members are brought into contact with each other. In addition, a layer 49 of heat-insulating air is also formed between the piston head 41 and piston skirt 42. A thin plate portion 45 of a ceramic material which is formed to an extremely small thickness so as to reduce the thermal capacity of the surface of the heat-insulating piston is provided on the piston head 41 via a heat-insulating member 43 of high porosity formed of ceramic whiskers so that the thin plate portion faces the combustion chamber. A ceramic ring 46, the material of which is the same as that of the ceramic thin plate portion 45 is fitted around the outer circumferential portion of the thin plate portion 45, and the ceramic thin plate portion 45 and ceramic ring 46 are joined to each other at a contact portion by chemical vapor deposition.

A stepped portion 56 is formed on the inner circumferential surface of the ceramic ring 46, and the outer circumferential portion of the piston head 41 is fitted in the ceramic ring 46 so as to contact the stepped portion 56 of the ring 46. The heat-insulating member 43 is sealed in a space defined by the ceramic thin plate portion 45, ceramic ring 46 and piston head 41, and this heat-insulating member 43 consists of whiskers of potassium titanate, zirconia fiber or the like. Since the piston head 41 is set in a pushed state in the piston skirt 42, the outer circumferential portion of the piston head 41 is pressed against the stepped portion 56 of the ceramic ring 46, and the ceramic ring 46 against the circumferential portion of the piston skirt 42. A gasket consisting of a carbon seal 47 for ensuring sealing between the ceramic ring 46 and piston skirt 42 is inserted therebetween.

It is very difficult to ensure satisfactory heat-insulating characteristics for a heat-insulating engine member such as a piston that utilizes a ceramic material as a heat-insulating or heat-resisting material. Since the ceramic material is exposed to the high temperature heat in the combustion chamber, it receives a thermal shock. Therefore, it is necessary that the member consisting of a ceramic material be formed to a preferable strength. If the thickness of the ceramic material constituting the wall is increased for the heat-insulating purpose, the thermal capacity of the wall becomes large. Accordingly, in a suction stroke, the suction air receives a large quantity of heat from the combustion chamber to cause the temperature of the suction air to increase, so that this heat adversely affects the air suction operation. As a result, the suction efficiency decreases, and the air suction operation stops. In contrast, in an expansion stroke, the heat-insulating characteristics must be improved.

The heat-insulating piston structure, disclosed in the afore-mentioned U.S. Pat. No. 4,848,291 and constructed as above to solve these problems, has excellent heat-insulating characteristics, can set to the lowest possible level the thermal capacity of the surface member of the piston head which faces the combustion chamber the temperature in which becomes high due to combustion gas to which the combustion chamber is exposed, can improve suction and cycle efficiencies, and does not give rise to a problem of strength of the surface of the piston head even when it receives a thermal shock. In this piston structure, thermal resistance, corrosion resistance and deformation resistance can be improved, and stable mounting can be ensured. Moreover, the pressure applied to the piston head during an explosion stroke can be received in a preferable condition, whereby an improved sealing capability can be ensured between the piston head and piston skirt.

However, in the above heat-insulating piston structure, the heat-insulating material interposed between the piston head base portion and the ceramic thin plate portion placed on the side of the combustion chamber consists of whiskers or fibers of mullite, alumina, potassium titanate, zirconia or the like, while the ceramic thin plate portion and ceramic ring consist of silicon nitride. This difference in the constituent of the relevant members causes the following drawback. Since the materials used for the heat-insulating material and the ceramic thin plate portion and ceramic ring that surround the heat-insulating material are different, there will be a difference in the thermal expansion between the heat-insulating material and the surrounding ceramic thin plate portion and ceramic ring as the temperature changes. Therefore, in a case where the relevant members are joined to each other at joint portions by virtue of chemical vapor deposition or coating, no strength for holding the heat-insulating material in position can be ensured when a difference in the thermal expansion occurs between the relevant members, and the heat-insulating material and the ceramic thin plate and ceramic ring are separated from each other at the joint portions, or cracks develop at the joint portions.

SUMMARY OF THE INVENTION

An object of the present invention is to provide a heat-insulating piston capable of solving the afore-mentioned problems in which not only an extremely high heat-insulating capability is ensured at the piston head portion but a heat-resisting capability is also ensured at the surface portion of the piston head that faces the combustion chamber the temperature in which becomes high due to exposure to combustion gas with the thermal capacity of the surface portion being made as low as possible so that the surface portion can follow the change in the temperature of combustion gas, whereby the suction efficiency can be improved, in which the surface portion is formed as a dense laminate using a ceramic material such as silicon nitride (Si3N4), silicon carbide (SiC) or the like, and in which a member consisting of the same ceramic material as that used for the laminate and the dense piston head base, but formed of fired whiskers portion is used as a heat-insulating member, whereby the heat-insulating member can be stably jointed to the laminate and piston head base portion, so that a sufficient strength can be ensured for the piston.

In order to attain its object, the heat-insulating piston according to the present invention comprises a dense ceramic piston head base portion fixed to a piston skirt, a heat-insulating member jointed to the piston head base portion and constituted by a member consisting of the same ceramic material as that used for the piston head base portion but in the form of fire whiskers and a dense laminate disposed on the surface of the heat-insulating member that is exposed to combustion gas and consisting of the same ceramic material as that of the piston head base portion.

In this heat-insulating piston, therefore, since the whisker-formed heat-insulating member consists of the same ceramic material as that used for the dense piston head base portion and the dense laminate portion disposed on the outer surface of the heat-insulating member, stable joints can be ensured between the heat-insulating member and the piston head base and laminate, whereby the strength of the piston can be sufficiently ensured, so that reliability can be ensured for the piston. In addition, an extremely high heat insulating capability can be obtained by the heat-insulating member because it comprises fired whiskers formed into a heat-insulating body, and the thickness of the laminate disposed on the surface of the piston head portion that is heated to a high temperature due to its exposure to combustion gas can be made as small as possible, while the thermal capacity thereof is made as low as possible. Consequently, the suction efficiency can be improved, and high resistance to heat, deformation and corrosion can be obtained by this laminate.

Another object of the present invention is to provide a heat-insulating piston comprising a dense ceramic piston head base portion mounted on the piston skirt portion and provided with a sliding surface, a cylindrical portion integrally formed with the piston head base portion so as to constitute the sliding surface, a ceramic whisker-formed heat-insulating member disposed in a cylindrical bore portion formed by the cylindrical portion, while being jointed to the upper surface of the piston head base portion and consisting of a whisker fired member of the same ceramic material as that of the piston head base portion, and a laminate jointed to the surface of the heat-insulating member that is exposed to combustion gas and consisting of the same ceramic material as that of the heat-insulating member.

In this heat-insulating piston, therefore, the heat-insulating member may be accommodated in the piston head base portion securely and stably. Moreover, even if a force is caused to downwardly act on a mounting boss portion provided at the center of the piston, since the upper surface of the piston head base portion and the lower surface of the heat-insulating member are stably jointed together, and since the outer circumferential portion of the heat-insulating member is made free relative to the cylindrical portion, the jointed state between the heat-insulating member and the piston head base portion is prevented from being adversely affected, and hence the stable joint between the relevant members may be maintained. Moreover, the jointed state between the heat-insulating member and the laminate disposed on the same is also prevented from being adversely affected.

A further object of the present invention is to provide a heat-insulating piston comprising a dense ceramic piston head base portion mounted on the piston skirt portion and provided with a sliding surface, a cylindrical portion integrally formed with the piston head base portion so as to constitute the sliding surface, a ceramic whisker-formed heat-insulating member disposed in a cylindrical bore portion formed by the cylindrical portion, while being jointed to the inner circumferential surface of the cylindrical portion and consisting of a whisker fired member of the same ceramic material as that of the piston head base portion, and a dense laminate jointed to the surface of the heat-insulating member that is exposed to combustion gas and consisting of the same ceramic material as that of the heat-insulating member.

In this heat-insulating piston, therefore, the heat-insulating member may be accommodated in the piston head base portion securely and stably. In addition, the heat-insulating member may be stably jointed to the piston head base portion at the circumferential surface thereof. Since the lower surface of the heat-insulating member and the upper surface of the piston head base portion are made free relative to each other, even if a large tensile force is caused to act between the heat-insulating member and the piston head base portion, the jointed state between these two members is prevented from being adversely affected, and hence the stable joint therebetween may be maintained. Moreover, the jointed state between the laminate and the heat-insulating member is also prevented from being adversely affected. Thus, it is possible to prevent a risk of any cracks or damages occurring in the heat-insulating member and the laminate, even if a tensile force is caused to act thereon.

DETAILED DESCRIPTION OF THE EMBODIMENT

Figure 1:
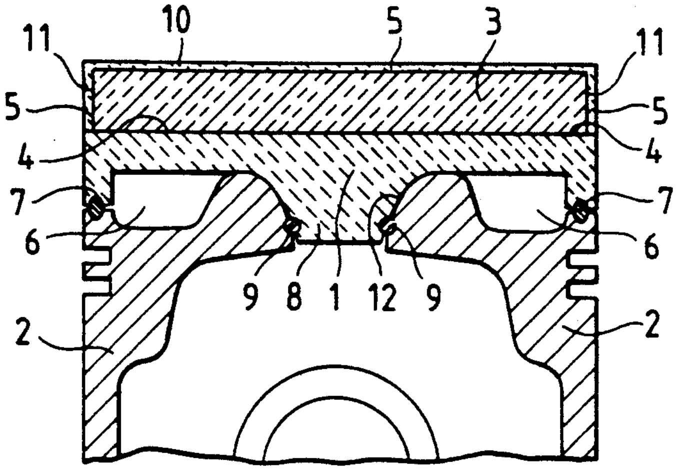
FIG. 1 is a vertical cross-sectional view of an embodiment of a heat-insulating piston of the present invention.

In order for a ceramic material to provide heat resistance, it is necessary that the ceramic material have a highly dense structure. Accordingly, in the present internal combustion engine, the head exposed in the combustion chamber is formed into a dense body from a ceramic material so that it has good resistance to the heat developed in the combustion chamber.

However, if the entire head is formed of a dense body of ceramic material, the head itself becomes a heat conductor or heat sinks and does not provide sufficient heat-insulating capability. Therefore, if the head exposed to combustion gas in a combustion chamber is made of a one-piece ceramic material, the head of this dense body has a large thermal capacity and absorbs large quantities of heat. In such a situation, i.e. when the thermal capacity of the dense ceramic piston head becomes great, suction air entering through the suction port becomes heated by the piston head and thermally expands so that the quantity of air to be sucked into the combustion chamber is less than desirable. As a result, the suction efficiency decreases, and the engine cannot be driven efficiently.

In order to solve these problems, and as pointed out above, the heat insulating piston disclosed in U.S. Pat. No. 4,848,291 was developed, in which the surface exposed to the high temperature combustion gas consists of a thin layer portion on the back side of which is disposed a heat insulating member having excellent heat insulating characteristics. Thus, heat which the thin layer portion receives from the combustion gas is blocked by this heat insulating member so that it is not transmitted to the piston head base. Also, because the thin layer portion has only a small thermal capacity because of its size, the quantity of heat which the thin layer portion receives from the combustion gas is small. Therefore, in this heat-insulating piston, the thin layer portion is heated easily with the combustion gas and cooled easily by the fresh suction air.

As a consequence, a combustion chamber capable of immediately following the temperature of the gas is provided, whereby a very small quantity of suction air can cool the wall of the piston which faces the combustion chamber, i.e. the thin layer portion. This avoids blocking of the supply of more suction air into the combustion chamber due to an expansion of suction air through heating, so that the suction air charging efficiency is improved.

The present invention operates on the same principle but is furthermore based on a different technical concept so as to overcome a serious deficiency inherent in the construction of U.S. Pat. No. '291. Thus, contrary to U.S. Pat. No. '291 where the insulating element and the thin layer portion are formed of different materials, with the consequent problems of different coefficients of expansion as pointed out above, in the present invention the piston head is formed of three pieces, i.e. a heat resistant dense ceramic thin layer portion, a heat insulating member made of ceramic whiskers, and a strength-securing piston head base portion of dense ceramic, in which all three pieces are made from the same ceramic material, such as $Si_3N_4$.

The excellent heat insulating characteristics provided by the heat insulating member is achieved by its formation from fired whiskers of a ceramic material which are united into a heat insulating body of lesser density than the piston head portion and the thin laminate covering, the latter of which are formed of the same material but are formed into dense bodies having a lower heat insulating capability.

In the present invention, thermal expansion of the heat resisting dense, thin layer portion formed of ceramic material, the heat insulating member which is formed of ceramic whiskers and is therefore not dense, and the dense strength-securing piston head base are all the same, and this enables the jointed or bonded structures between these three portions to be sufficiently strong and not easily separated, as would be the case if they were of different materials having different coefficient of thermal expansion.

Referring to the drawings, embodiment of the heat-insulating piston according to the present invention will now be described in detail.

FIG. 1 is a vertical cross-sectional view of an embodiment of the heat-insulating piston according to the present invention. This heat-insulating piston comprises a piston head and a metallic piston skirt 2. Mainly, this piston head comprises a piston head base portion 1 made of $Si_3N_4$, a heat-insulating member 3 made of $Si_3N_4$ and a laminate 5 mad of $Si_3N_4$. The piston head base portion 1 consists of a ceramic material such as silicon nitride (Si3N4), silicon carbide (SiC) or the like, and has at its central portion a mounting boss portion 8. There is no combustion chamber formed in the piston head base portion 1, and the side of this piston head base portion 1 that faces a combustion chamber is formed flat. Formed in the central portion of the piston skirt 2 is a central mounting hole 12 into which the mounting boss portion 8 of the piston head base portion 1 is fitted. The mounting boss portion 8 of this piston head base portion 1 is fitted in the central mounting hole 12 of the piston skirt 2, and a metal ring 9 is inserted in a deformed state in fitting grooves formed in the mounting boss portion 8 and the central mounting hole 12 of the piston skirt 2, respectively, by utilizing the metal flow thereof, whereby the piston head base portion 1 is locked to the piston skirt 2 in a pressed state. In addition, a sealing member 7 is interposed in a pressed state at a position where the circumferential bottom surface of the piston head base portion 1 and the circumferential top surface of the piston skirt 2 are brought into contact with each other. A layer of heat-insulating air 6 is formed between the piston head base portion 1 and the piston skirt 2. A powerfully jointed or bonded juncture 4 may be a fired ceramic material such as silicon nitride ($Si_3N_4$) or silicon carbide (SiC) or the like.

The heat-insulating piston according to the present invention having a structure as described above has the following characteristics. Namely, this heat-insulating piston has the heat-insulating member 3 for constituting a heat-insulating layer jointed to the piston head base portion 1 and consisting of a whisker fired member of the same ceramic material as that of the piston head base portion 1, and a laminate 5 jointed to the surface of the heat-insulating member 3 that faces the combustion chamber, i.e. the surface 10 that is exposed to combustion gas, as well as to the surface 11 of the same that slides over a cylinder liner (not shown) and consisting of the same ceramic material as that of the heat-insulating member 3. The heat-insulating member 3 consists of a whisker fired member of a ceramic material such as silicon nitride (Si3N4), silicon carbide (SiC) or the like, and this whisker fired member is jointed to the top surface 4 of the piston head base portion 1 consisting of the same ceramic material as its own ceramic material. In addition, the laminate 5 disposed on the outer surface of the heat-insulating member 3 also consists of a ceramic material such as similar silicon nitride (Si3N4), silicon carbide (SiC) or the like, and is disposed so as to be jointed to the surface of the heat-insulating member 3 that is exposed to combustion gas, i.e. the surface 10 that faces the combustion chamber and the surface 1 of the same member 3 that slides relative to the cylinder liner by virtue of chemical vapor deposition or coating.

In this way, this laminate 5 constitutes not only the surface that is exposed to combustion gas but also the surface sliding relative to the cylinder liner. Moreover, the laminate is formed to an extremely small thickness. Thus, the thermal capacity of the surface that is exposed to combustion gas may be reduced to a low level with a sufficient heat-insulating capability being ensured. The heat-insulating member 3 constituted by a whisker fired member of a ceramic such as silicon nitride (Si3N4), silicon carbide (SiC) or the like may function not only as a heat insulator but also as a structure member for receiving a pressure acting on the laminate 5 in an explosion stroke. In this heat-insulating piston, a compressive force generated in an explosion stroke needs to be received by the heat-insulating member 3 in a uniform fashion, and in order to make this possible, the top surface 4 of the piston head base portion 1 and the laminate 5 are formed flat.

Figure 2:
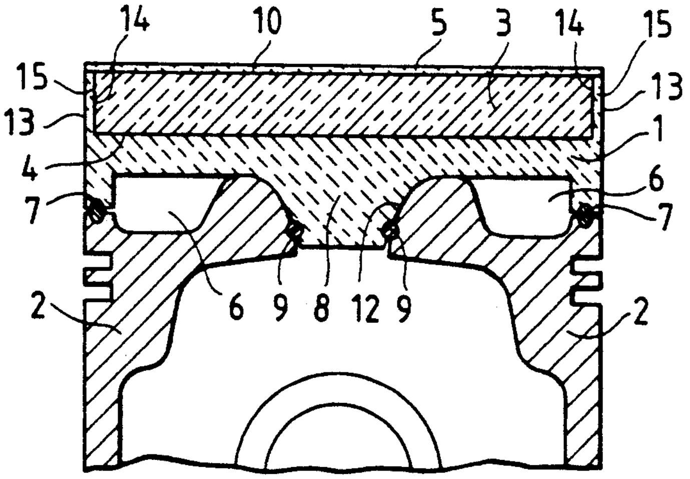
FIG. 2 is a vertical cross-sectional view of another embodiment of a heat-insulating piston of the present invention.

Referring to FIG. 2, another embodiment of the heat-insulating piston in accordance with the present invention is described wherein all three pieces are also made from the same ceramic material of silicon nitride. The structure and functions of the heat-insulating piston according to this embodiment are similar to those of the heat-insulating piston described above except that the configuration of the piston head base portions 1 of the respective piston head base portions are slightly different from each other. Therefore, like reference numerals are given to like constituent members, and similar descriptions will be omitted. As in the case of the above-described heat-insulating piston, the piston head base portion 1 is mounted on the piston skirt 2, but in this case, the piston head base portion 1 has a sliding surface 13 upwardly extending to the top end surface of the piston head. In other words, the piston head base portion 1 has an integral thin cylindrical portion 15 at its circumferential top end portion, and therefore a cylindrical bore portion 14 surrounded by the cylindrical portion 15, i.e. a thin wall portion, is formed on the side that faces the combustion chamber. The heat-insulating member 3 consisting of a whisker fired member of a ceramic material such as silicon nitride (Si3N4), silicon carbide (SiC) or the like that is the same as that of the cylindrical portion 15 is disposed in the cylindrical bore portion 14 constituted by this cylindrical portion 15 so as to form a heat-insulating layer. This heat-insulating member 3 is jointed to the bottom of the cylindrical bore portion 14, i.e. the upper surface 4 of the piston head base portion 1, and the laminate 5 consisting of the same ceramic material as that of the heat-insulating member 3, i.e. a ceramic material such as silicon nitride (Si3N4), silicon carbide (SiC) or the like, is jointed to the surface 10 of the heat-insulating member 3 that faces the combustion chamber by virtue of chemical vapor deposition, coating or the like.

Figure 3:
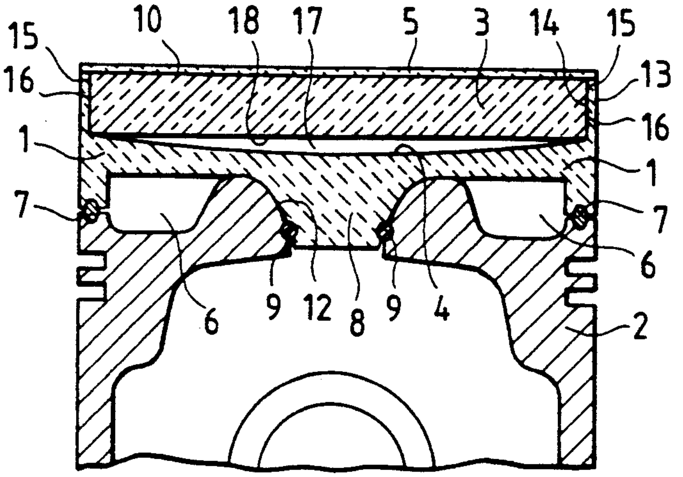
FIG. 3 is a vertical cross-sectional view of a further embodiment of a heat-insulating piston of the present invention.

Referring to FIG. 3, a further embodiment of the heat-insulating piston in accordance with the present invention will now be described, wherein all three pieces are also made from the same ceramic material of silicon nitride. Since the structure and functions of the heat-insulating piston of this embodiment are the same as those of the heat-insulating piston shown in FIG. 2 except that the position where the heat-insulating member is jointed is slightly different from each other, like reference numerals are given to like constituent members, and similar descriptions will be omitted. The heat-insulating member 3 is jointed to the piston head base portion 1 at the inner circumferential surface, i.e. a joint portion 16, of the cylindrical portion 15 formed in the piston head base portion 1. Namely, the sealing member 7 is interposed between the outer circumferential bottom end surface of the piston head base portion 1 and the outer circumferential top end surface of the piston skirt 2, and in order to ensure good sealing state by the sealing member 7, a force is caused to downwardly act on the mounting boss portion 8 formed in the central portion of the piston head base portion 1, and a gap 17 develops between the upper surface 4 of the piston head base portion 1 and the lower surface 18 of the heat-insulating member 3. In FIG. 3, this gap 17 is exaggerated, and in reality the gap is so narrow that it cannot be recognized visually. Since the heat-insulating member 3 is jointed to the inner circumferential surface of the cylindrical portion 15 formed on the circumferential upper end portion of the piston head base portion 1, in other words, since the joint portion 16 coincides with the outer circumferential portion of the heat-insulating member 3, even if a downward force is caused to act on the mounting boss portion 8 so as to cause a gap, any force for separating the joint portion 16 from the heat-insulating member 3 is prevented from acting on the relevant members due to the urging force generated by sealing the heat-insulating member 3 in the cylindrical bore portion 14. Thus, the joint portion 16 is prevented from being adversely affected due to the generation of a gap, and the stable jointed state between the piston head base portion 1 and the heat-insulating member 3 may be maintained. In addition, the jointed state between the heat-insulating member 3 and the laminate 5 jointed to the top surface 10 of the same member by virtue of chemical vapor deposition, coating or the like is prevented from being adversely affected.

Figure 4:
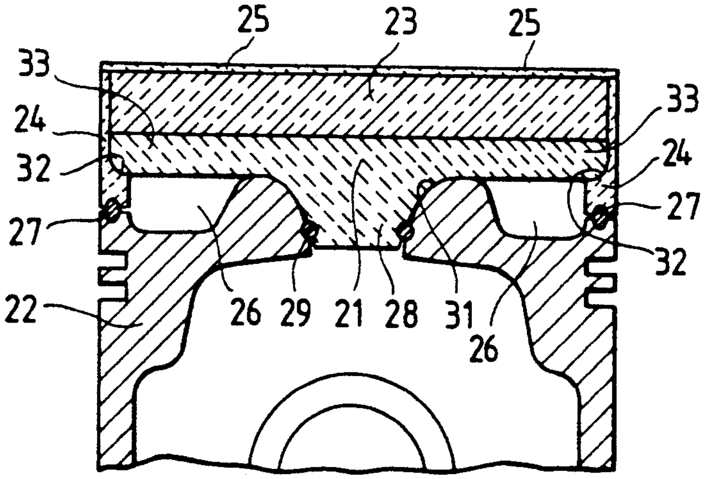
FIG. 4 (PRIOR ART)
FIG. 4 is a vertical cross-sectional view of an embodiment of a conventional heat-insulating piston.
Figure 5:
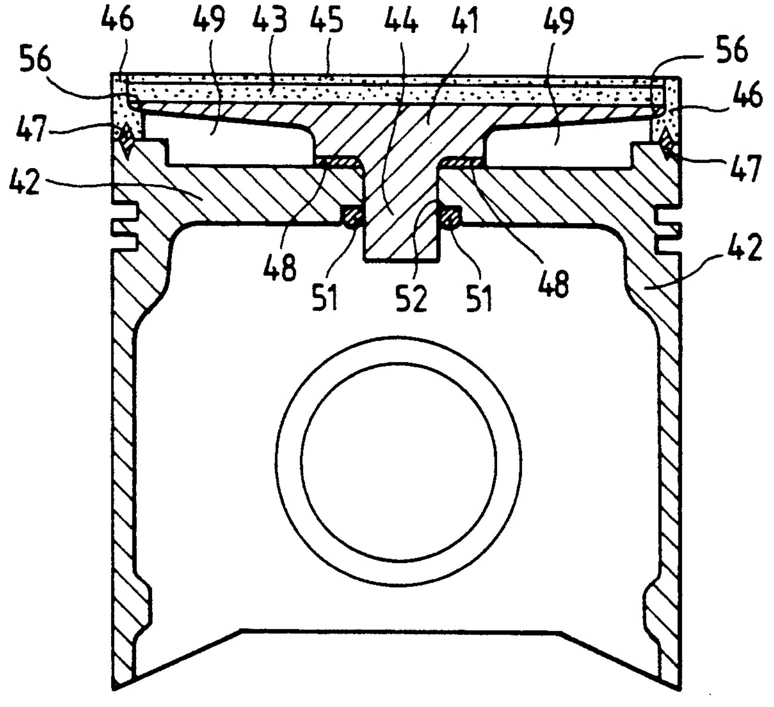
FIG. 5 (PRIOR ART)
FIG. 5 is a vertical cross-sectional view of another embodiment of a conventional heat-insulating piston.

FIGS. 4 and 5 depict the prior art, wherein laminates 25 and 45 are made of the ceramic material silicon nitride and heat-insulating members 23 and 43 are made of the ceramic material $Al_2TiO_5$. In FIGS. 4 and 5, the piston head base portions are made of silicon nitride and the different coefficients of thermal expansion will encumber the heat insulating piston structure in the manner previously described.

What is claimed is:

1. A heat insulating piston structure comprising:

a piston skirt provided with an upper end circumferential portion;

a piston head base portion of a high strength fixed to said piston skirt and formed from a ceramic material into a dense body, wherein a lower end circumferential portion of said piston base portion is fixed in a pressed state to said upper end circumferential portion of said piston skirt;

a heat insulating member of an excellent heat insulating characteristic provided on an upper surface of said piston head base portion and consisting of a member made of fired whiskers of a ceramic material united into a heat insulating body of lesser density than said piston head portion; and a thin laminate covering and joined to an upper surface of said heat insulating portion, said thin laminate forming a surface exposed to a combustion gas and formed from a ceramic material into a dense body;

said piston head base portion, said heat insulating member and said laminate being formed out of the same kind of ceramic material, having the same coefficient of thermal expansion, and not generating a difference of thermal expansion between them;

said laminate being firmly joined to said heat insulating member;

the lower surface of said heat insulating member being firmly joined only to the upper surface of said piston head base portion;

said heat insulating member having heat insulating capability superior to that of said laminate;

whereby conduction of the heat which said laminate receives from the combustion gas is cut off by said heat insulating member and conduction of heat from said laminate to said piston head base portion is cut off by said heat insulating member so that thermal capacity of said laminate is reduced and intake efficiency is thereby improved.

2. A heat-insulating piston structure as set forth in claim 1, wherein the ceramic material constituting said piston head base portion and said laminate is silicon nitride, and the ceramic material constituting said heat-insulating member is silicon nitride fired whiskers.

3. A heat-insulating piston as set forth in claim 1, wherein said laminate is formed on said heat-insulating member by virtue of chemical vapor deposition by the ceramic materials.

4. A heat-insulating piston as set forth in claim 1, wherein said laminate is jointed to the upper surface and outer circumferential surface of said heat-insulating member.

5. A heat insulating piston structure comprising:

a piston skirt provided with an upper end circumferential portion;

a piston head base portion of a high strength fixed to said piston skirt and formed from a ceramic material into a dense body, wherein a lower end circumferential portion of said piston base portion is fixed in a pressed state to said upper end circumferential portion of said piston skirt;

a heat insulating member of an excellent heat insulating characteristic provided on an upper surface of said piston head base portion and consisting of a member made of fired whiskers of a ceramic material united into a heat insulating body of lesser density than said piston head portion; and a thin laminate covering and joined to an upper surface of said heat insulating portion, said thin laminate forming a surface exposed to a combustion gas and formed from a ceramic material into a dense body;

said piston head base portion having a cylindrical portion formed integrally out of a ceramic material so as to form a sliding surface extending upward from the circumference of said piston head base portion;

said piston head base portion, said heat insulating member and said laminate being formed out of the same kind of ceramic material, having the same coefficient of thermal expansion, and not generating a difference of thermal expansion between them;

said laminate being firmly joined to said heat insulating member;

said head insulating member being disposed in a cylindrical bore portion defined by said cylindrical portion, and the lower surface of said heat insulating member being firmly joined only to the upper surface of said piston head base portion;

said heat insulating member having heat insulating capability superior to that of said laminate whereby conduction of the heat which said laminate receives from the combustion gas is cut off by said heat insulating member and conduction of heat from said laminate to said piston head base portion is cut off by said heat insulating member so that thermal capacity of said laminate is reduced and intake efficiency is thereby improved.

6. A heat-insulating piston structure as set forth in claim 5, wherein the ceramic material constituting said piston head base portion, said cylindrical portion, and said thin laminated layer portion is silicon nitride, and the ceramic material constituting said heat-insulating member is silicon nitride fired whiskers.

7. A heat-insulating member as set forth in claim 5, wherein said laminate is formed on the upper surface of said heat-insulating member by virtue of chemical vapor deposition by the ceramic materials.

8. A heat insulating piston structure comprising:

a piston skirt provided with an upper end circumferential portion;

a piston head base portion of a high strength fixed to said piston skirt and formed from a ceramic material into a dense body, wherein a lower end circumferential portion of said piston base portion is fixed in a pressed state to said upper end circumferential portion of said piston skirt;

a heat insulating member of an excellent heat insulating characteristic provided on an upper surface of said piston head base portion and consisting of a member made of fired whiskers of a ceramic material united into a heat insulating body of lesser density than said piston head portion; and a thin laminate covering and joined to an upper surface of said heat insulating portion, said thin laminate forming a surface exposed to a combustion gas and formed from a ceramic material into a dense body;

said piston head base portion having a cylindrical portion formed integrally out of a ceramic material so as to form a sliding surface extending upward from the circumference of said piston head base portion;

said piston head base portion, said heat insulating member and said laminate being formed out of the same kind of ceramic material, having the same coefficient of thermal expansion, and not generating a difference of thermal expansion between them;

said laminate being firmly joined to said heat insulating member;

said head insulating member being disposed in a cylindrical bore portion defined by said cylindrical portion, and being firmly joined only to the inner circumferential surface of said cylindrical portion;

said heat insulating member having heat insulating capability superior to that of said laminate whereby conduction of heat which said laminate receives from the combustion gas is cut off by said heat insulating member and conduction of heat from said laminate to said piston head base portion is cut off by said heat insulating member whereby thermal capacity of said laminate is reduced and intake efficiency is thereby improved.

9. A heat-insulating piston structure as set forth in claim 8, wherein the ceramic material constituting said piston head base portion, said cylindrical portion and said laminate is silicon nitride, and the ceramic material constituting said heat-insulating member is silicon nitride fired whiskers.

10. A heat-insulating piston as set forth in claim 8, wherein said laminate is formed on the upper surface of said heat-insulating member by virtue of chemical vapor deposition by the ceramic materials.

* * * * *